(No Model.) 2 Sheets—Sheet 1.
R. D. HAINES.
INSULATOR.
No. 451,379. Patented Apr. 28, 1891.
FIG. I.
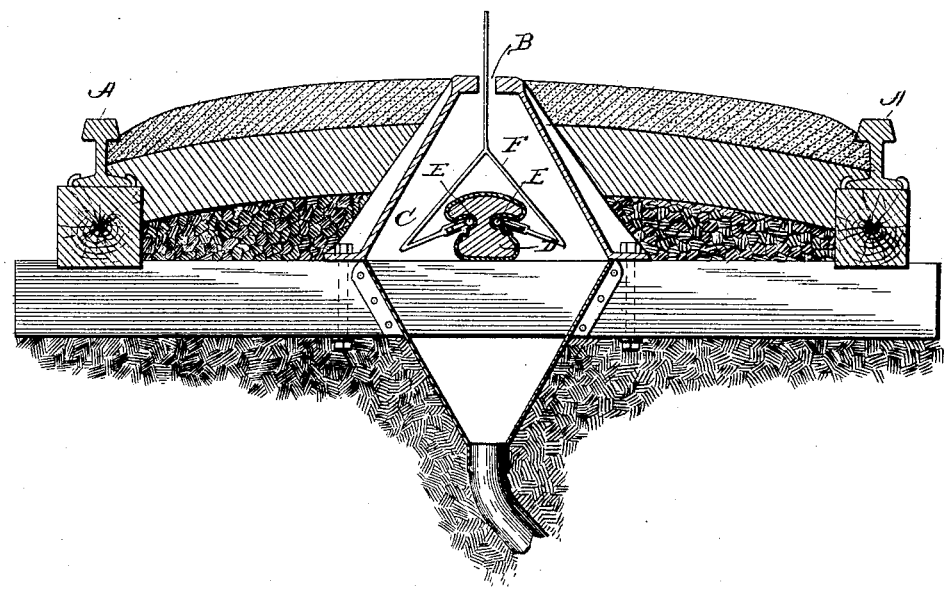
FIG. II.
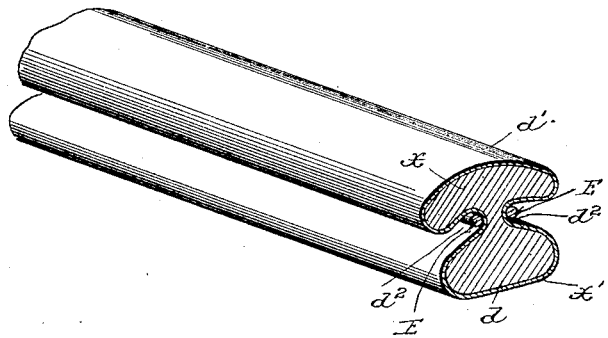
Witnesses:
Inventor:
Robert D. Haines.
By Knight Bros.
Attorneys (No Model.) 2 Sheets—Sheet 2.
R. D. HAINES.
INSULATOR.
No. 451,379. Patented Apr. 28, 1891.
FIG. III.
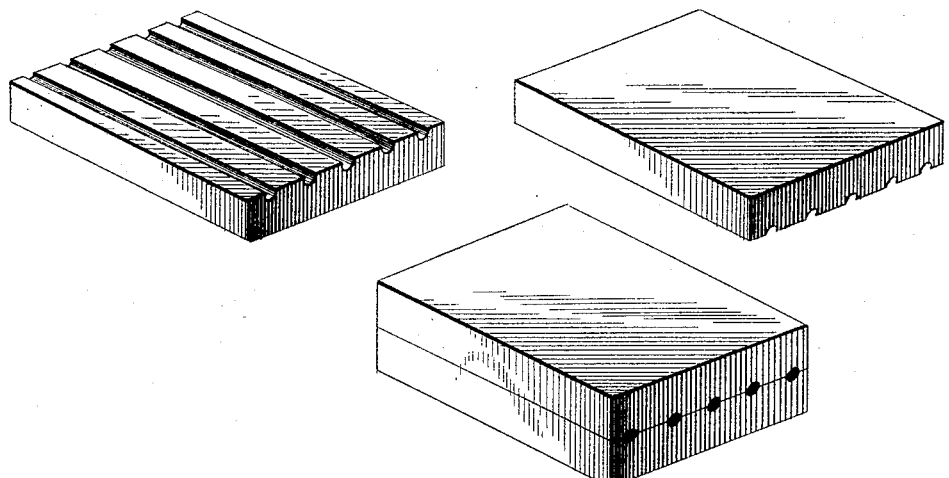
FIG. IV.
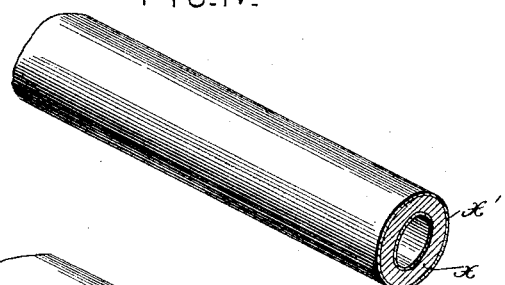
FIG. V.
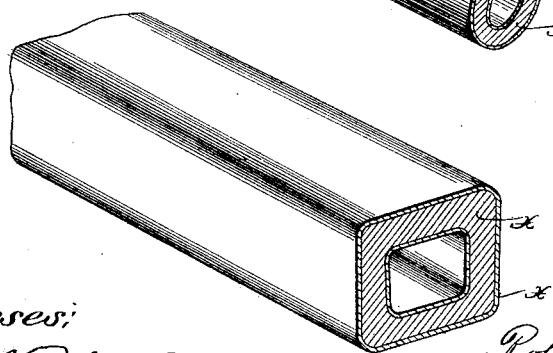
Witnesses:
Harry S. Rohrer
William E. Knight
Inventor:
Robert D. Haines
By Knight Bros
Attorneys.

UNITED STATES PATENT OFFICE.

ROBERT D. HAINES, OF CORNING, NEW YORK, ASSIGNOR OF TWO-THIRDS TO ALANSON B. HOUGHTON AND ARTHUR A. HOUGHTON, BOTH OF SAME PLACE.

INSULATOR.

SPECIFICATION forming part of Letters Patent No. 451,379, dated April 28, 1891.

Application filed December 12, 1890. Serial No. 374,470. (No model.)

*To all whom it may concern:*

Be it known that I, ROBERT D. HAINES, a citizen of the United States, residing at Corning, in the county of Steuben and State of New York, have invented a certain new and useful Process of Manufacturing Conduits for Underground Electric Conductors; and I do hereby declare that the following specification, taken in connection with the accompanying drawings, is a full, clear, and exact description of my invention, such as will enable those skilled in the art to which it appertains to practice the same.

Heretofore in the construction of insulator-sections of terra-cotta or clay the clay has been molded into proper shape and glazed by any of the well-known means, so as to form a coating which will be impermeable to moisture, and thereby protect the insulated wires. The insulator formed in this well-known manner does not accomplish the desired result as sucessfully as is necessary for the perfect insulation of the conducting-wires from the moisture, first, because it is not a perfect non-conductor, and, second, because the glaze will not withstand the action of the elements, but will crack and wear away and expose the clay core. The perfect insulator, it has been supposed, would be one formed entirely of glass. This, however, has been deemed impracticable for many reasons, among which the following are prominent: first, the impracticability of forming sections of any considerable length; second, the enormous cost, and, third, its brittleness, which renders it liable to fracture by sudden shock.

In view of the above it is the object of my present invention to form an insulator economically, which will combine all the advantages of glass and none of its disadvantages. To this end I form the insulator-sections in the following manner: I first mold the clay into the desired form; next bake or otherwise dry it until it is firm and rigid, and then dip or submerge the hardened article in molten glass, or otherwise cover it with glass in a plastic state. A thick coating or plate of glass adheres to the article, it being absorbed into the pores of the hardened clay, and the article, with its plate of glass, is then exposed to the heat of a melting-furnace or passed through suitable dies to insure the integrity of the coating of the glass and its more perfect cohesion to the clay. The glass plated or coated article is finally placed in a kiln and properly annealed and then allowed to gradually cool. By this process an article is produced having all of the advantages and none of the disadvantages of glass. The article differs from a glazed-pottery article in that it has a distinct plate of glass surrounding the clay, and neither the clay nor the glass are changed in any way, both retaining their individual qualities and being held together by the cohesion of the glass and clay, the glass entering the pores of the clay and making a firm union between them, whereas in a glazed-pottery article the surface of the clay upon which the glaze is formed and the substance which is added to form the glaze are both changed in character into a combination of the two, which combination is called a "glaze," and becomes a part of the clay.

Referring to the drawings, I have shown several forms of insulators constructed by my improved process.

In said drawings, Figure I is a cross-section of a track and conduit having my invention applied. Fig. II is a perspective view of a rail-section. Figs. III, IV, and V are views of other forms of insulator-sections formed after my improved manner of construction.

The object of this improved rail or wire support for the conduits of underground electric-railway systems (shown in Figs. I and II) is to hold the conductor in convenient position for taking the current from the wires to the car, and at the same time protect the wires from the water which drips through the slot from the street.

A are the railway-rails, B the slot, and C the conduit in which the conducting-wires are supported.

D is the support or conductor-rail, composed of a core of baked clay and a coating of glass and formed with a flat supporting-base $d$, a cap portion $d'$, with sloping top and upwardly-extending or curved longitudinal grooves $d^2$. The grooves $d^2$ support the wires E, which conduct the current. The grooves may be formed with or without the lower faces. (Shown in Fig. I.)

F is any form of plow or current-collector.

An article formed in the above manner accomplishes all the desired results.

Figs. III, IV, and V show the broad application of my invention to any form of insulator-section.

In each form of the invention $x$ represents the baked-clay core, and $x'$ represents the glass coating. This article, formed of baked clay and glass, as hereinbefore described, can be employed for any purposes where it is desired to insulate and protect wires from moisture, and at the same time it will be found that the insulating and protecting article is imperishable.

Having thus described my invention, the following is what I claim as new and desire to secure by Letters Patent:

1. The herein-described process of manufacturing insulating conduits or coverings for electric conductors, which consists in forming a body or core of clay, drying it until it is firm and rigid, then dipping or submerging it in molten glass or otherwise covering it with glass in a plastic state, and finally annealing the glass-plated conduit in a suitable kiln.

2. The process of manufacturing insulating conduits or coverings for electric conductors, which consists in molding the conduit or body of clay in the required form, drying it until it is firm and rigid, then dipping or submerging it in molten glass or otherwise covering it with glass in a plastic state, then exposing it to the heat of a melting-furnace or passing it through dies to insure the integrity of the covering and its more perfect cohesion to the clay, and finally annealing the said glass-plated conduit in a suitable kiln.

ROBERT D. HAINES.

Witnesses:
ALANSON B. HOUGHTON,
ARTHUR A. HOUGHTON.